United States Patent [19]
Breuner

[11] 3,865,511
[45] Feb. 11, 1975

[54] ROTOR BLADE AND HUB ATTACHMENT AND CONTROL

[76] Inventor: Gerald L. Breuner, 50 Melody Ln., Orinda, Calif. 94563

[22] Filed: Feb. 8, 1974

[21] Appl. No.: 440,852

[52] U.S. Cl. ................................................ 416/141
[51] Int. Cl. ........................................... B64c 27/38
[58] Field of Search ............ 416/135, 136, 138, 141

[56] References Cited
UNITED STATES PATENTS

| | | | |
|---|---|---|---|
| 2,509,184 | 5/1950 | Brantly | 416/141 |
| 2,757,745 | 8/1956 | Verhage et al. | 416/138 UX |
| 2,845,131 | 7/1958 | Lawfer | 416/141 |
| 3,667,863 | 6/1972 | Breuner | 416/141 X |

Primary Examiner—Everette A. Powell, Jr.
Attorney, Agent, or Firm—Robert H. Eckhoff

[57] ABSTRACT

This invention relates to an improved attachment for rotary wing aircraft where a pair of cables are connected between a central rotor hub and a bearing fixture adjacent the inner end of a blade. A rotatable spar is journaled in the bearing fixture and supports the blade such that the blade may be feathered or changed in pitch by rotating the spar independently of the position of the cables or fixture. The cables allow the blade to change in lead-lag and in flap movements but do not interfere with the pitch control of the blade. A pitch control tube is journaled in a fixture on the hub and is pivotally connected to the rotatable spar to change the pitch of the blade and also provide the droop stop therefor.

9 Claims, 2 Drawing Figures

PATENTED FEB 11 1975

3,865,511

ROTOR BLADE AND HUB ATTACHMENT AND CONTROL

BACKGROUND OF THE INVENTION

This is an improvement on my issued U.S. Pat. No. 3,667,863 entitled "Rotor Hub and Blade Attachments" and on my co-pending application for "Attachment for Rotor Hub and Pairs of Blade," Ser. No. 431,382, filed Jan. 7, 1974. As shown therein, a series of cables are used in place of normal solid hinges to provide movement between the hub and blade. This arrangement has proven to provide a smooth functioning system which allows the blade to deflect due to air flow dislocations in the lead-lag and flap directions. At higher blade RPM and greater centrifugal load, however, it has been found that considerable control stick pressure is necessary to deflect the cables to achieve a pitch change control movement.

SUMMARY OF THE INVENTION

It is therefore a principal object of the present invention to provide an improved attachment for rotor blades to a central rotor hub by a pair of cables wherein control of the pitch of the blade does not require deflection of the connecting cables.

It is another object of the present invention to provide an attachment between a central rotor hub and a rotor blade of a rotary wing aircraft which allows improved pitch control response of the blade while permitting normal action of the blade in the lead-lag and flap components of movement.

Another object is to provide such an attachment device which allows for adjustment of the cables and a mounting therefor which is of a simple design and is economical to produce.

These and other objects and advantages will become apparent from the following description considered in connection with the accompanying drawings; it being expressly understood, however, that the drawings are for purpose of illustration and description only, and are not intended as a definition of the limits of the invention.

DESCRIPTION OF THE PREFERRED EMBODIMENT

Figure 1:
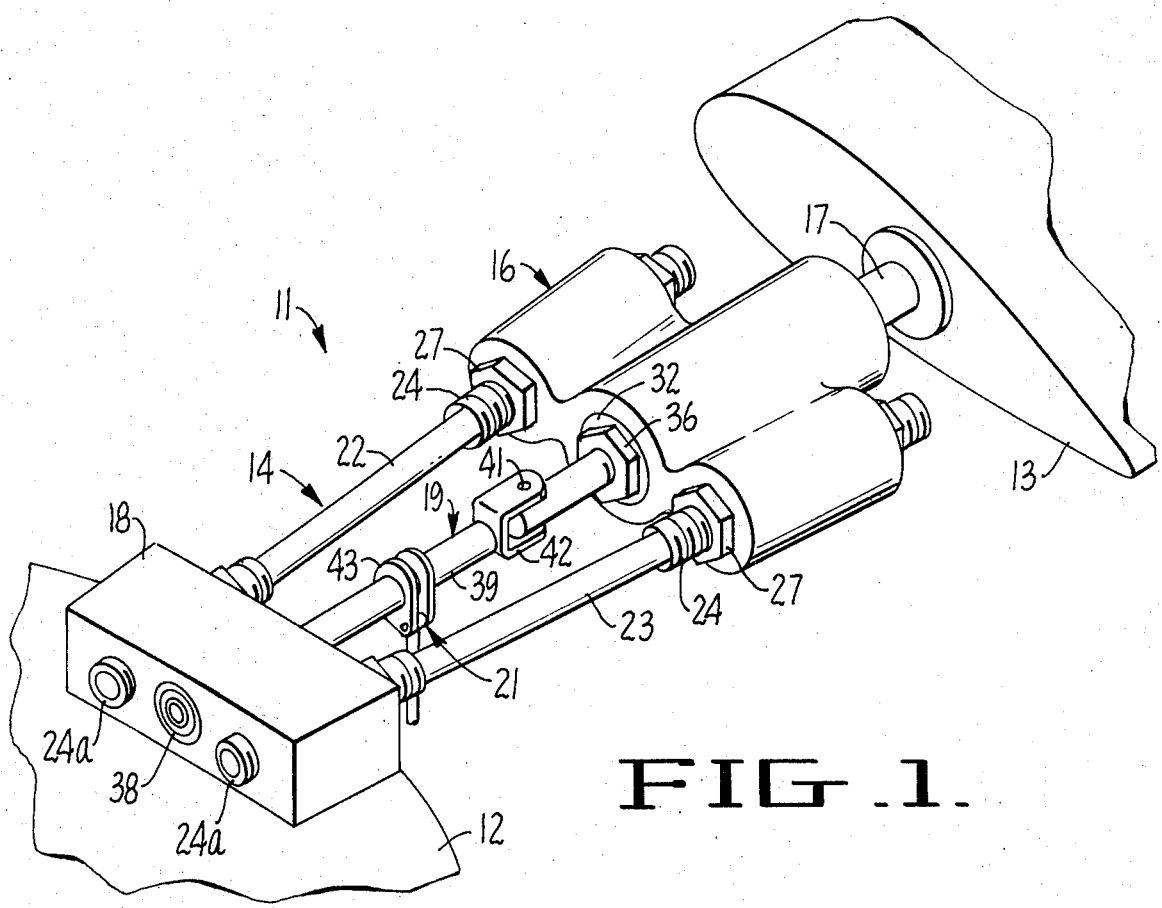
FIG. 1 is a fragmentary perspective view illustrating the preferred embodiment of the present invention.
Figure 2:
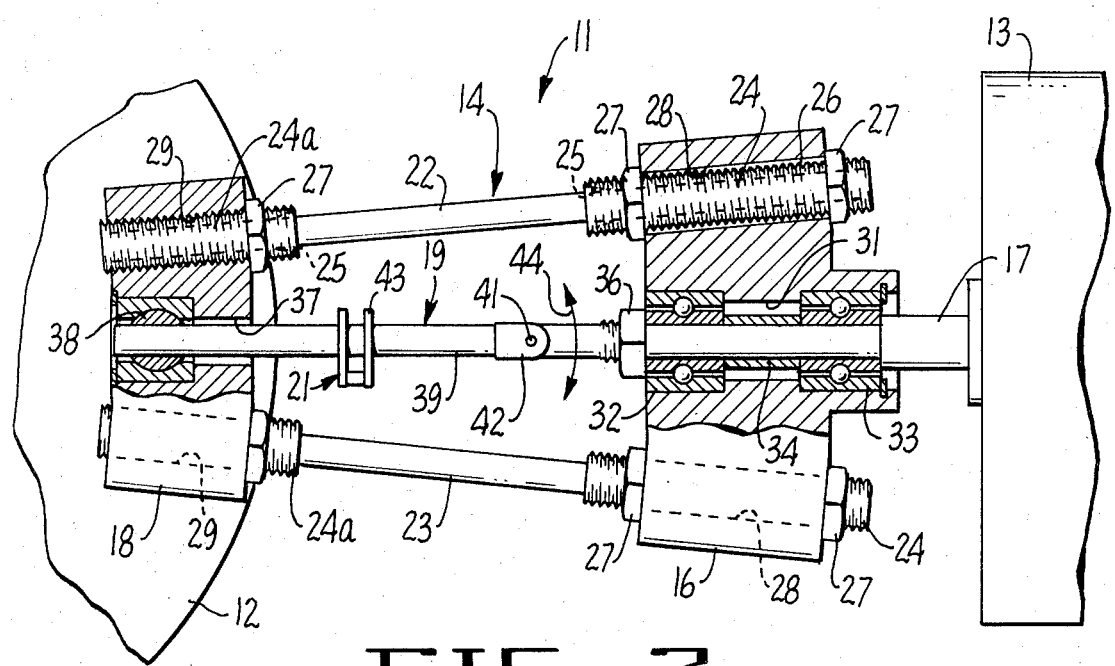
FIG. 2 is a plan view of the device in FIG. 1 with parts broken away to show the attachment and support means between the central rotor hub and a blade.

In the drawings, there is shown an attachment device 11 between a central rotor hub 12 and a blade 13. While only a single combination of attachment device and blade is shown, it should be appreciated that the number of combinations may be increased to any desired number. As mentioned, this invention makes use of the advantages of my cable attachment system and augments it with a separate means for the pitch change control of the blade.

A pair of cable means 14 are attached to the hub and extend radially outward therefrom toward the inner end of blade 13. A first fixture means 16 is secured to the outer ends of the pair of cable means 14 and is coupled to the inner end of blade 13 through blade spar 17. Blade spar 17 is rotatably journaled in fixture 16 and extends radially therefrom to support the inner end of blade 13. A second fixture means 18 attached to the central rotor hub 12 supports and carries the inner end of the pair of cable means 14. Pitch control means 19 is coupled to rotatable spar 17 while means 21 is provided to rotate spar 17 through pitch control means 19 to selectively change the pitch of the blade independently of the position of cable means 14 and fixture 16.

The pair of cable means 14 includes multistrand cables 22 and 23 which may be spirally twisted as in the aforementioned application or a straight stranded non-rotating type, either of which should be coated with a synthetic resin coating to dampen vibration.

Cables 22 and 23 are attached to fixtures 16 and 18 by an improved swagged fitting 24. The fittings 24 are now threaded along their length as at 26 and have nuts 27 to abut the end faces of fixtures 16 and 18. Fittings 24 similarly have their inner ends relieved by a large radius chamfer as at 25 to permit cables 22 and 23 to flex as disclosed in the prior application.

First fixture means 16 has a pair of throughbores 28 for accepting the threaded swagged fittings 24 of cable means 14. Second fixture means 18 has threaded bores 29 for accepting threaded swagged fittings 24a. Adjustment of the cable length is effected by nuts 27 on fitting 24 abutting the ends of fixture 16. As shown, bores 28 and 29 are aligned such that the pair of cable means 14 diverge as they extend between the hub and blade.

First fixture means 16 is generally T-shaped in plan with throughbores and cable connections in the outer crossbars of the T. Centrally thereof is a throughbore 31 carrying bearings 32 and 33 and spacer 34 for supporting blade spar 17. Spar 17 is rigidly attached to the inner end of blade 13 and is rotatably held in the bearing mount of bearings 32 and 33 by nut 36.

Second fixture means 18 is rigidly attached to central rotor hub 12 and has throughbore 37 centrally of the cable attaching bores 29. Spherical bearing 38 in bore 37 supports pitch change tube 39 aligned with rotatable spar 17. The outer end of tube 39 is pivotally connected through transverse pin 41 and clevis 42 to an inner extension of spar 17 intermediate the first and second fixtures 16 and 18. Tube 39 also carries bracket 43 for controlling the attitude of pitch change tube 39 and spar 17 through the control stick to selectively change the pitch of the blade. Tube 39 similarly provides the droop stop for the blade when the inner end of tube 39 rests on the face pad of bore 37 in fixture 18 or on a ball bushing type rest (not shown). A tube (not shown) concentric with tube 39 or other device can also be used as a droop stop.

With the arrangement shown, the attributes of having supporting cables between the blade and hub are augmented by having the blade carried in a bearing mount at the outer ends of the cables. Thus the blade may move in the lead-lag direction by swinging blade spar 17 about pivot 41 as defined by arrow 44 while the spaced cables 22 and 23 flex and provide the desired support. Similarly, the blade may move up and down in the flap direction with control tube 39 moving in spherical bearing 38 and the cables providing support. These movements may occur without adding undue stress on the pitch control means 19 and without undesirable back pressure on the control stick. To change the pitch of blade 13, spar 17 is rotated by pitch change tube 39 with means 21 and moves the blade to another pitch setting irrespective of the position or load on the cables.

From the foregoing, it will be seen that I have provided an improved means for attaching rotor blades to a central rotor hub which decreases the control stick pressure required to change blade pitch and which allows handling increased centrifugal loads on the attachment device.

I claim:

1. In a rotating wing aircraft having rotor blades carried about a central rotor hub an improved attachment and control means for said blades and hub comprising,
   a. a pair of cable means attached to said hub and extending radially outward from the hub toward the inner end of a blade,
   b. a first fixture means secured to the outer ends of the pair of cable means,
   c. a blade spar rotatably journaled in said first fixture means and extending radially therefrom to support the inner end of the blade,
   d. a second fixture means attached to the central rotor hub for supporting and carrying the inner end of the pair of cable means,
   e. a pitch control means coupled to said rotatable spar, and
   f. means for rotating the pitch control means to selectively change the pitch of the blade.

2. The attachment and control device as defined in claim 1 and wherein, said rotatable spar and said pitch control means are coupled by a transverse pivot which allows the blade to move in the lead-lag direction without affecting the pitch control means.

3. The attachment and control device as defined in claim 1 and wherein, said pair of cable means are laid in spaced relation between the first and second fixtures.

4. The attachment and control device as defined in claim 3 and wherein, said spar is carried on bearings in a radial bore in the first fixture centrally of the outer ends of the cables such that the blade is balanced between the pair of cable means.

5. The device as defined in claim 2 and wherein, said pitch control means is carried in said second fixture and said transverse pivot is positioned intermediate the first and second fixtures.

6. The device as defined in claim 5 and wherein, said pitch control means is carried in said second fixture in a spherical bearing to allow the pitch control means to follow the first fixture in the lead-lag and flap movements, and wherein said pitch control means forms the droop stop for the blade by abutting a pad on the second fixture.

7. The device as defined in claim 3 and wherein, said pair of cable means diverge between the hub and blade.

8. The device as defined in claim 3 and wherein, the ends of said cable means are secured in swagged fittings, and said fittings are threaded to allow adjusting of the fittings and cables between the first and second fixtures.

9. In a rotating wing aircraft having rotor blades carried about a central rotor hub an improved attachment and control device for said blades and hub comprising,
   a. cable means formed to support the blade on the hub and allow the blade to move in the lead-lag and flap directions,
   b. blade support means intermediate said cable means and said blade for supporting the blade at the outer ends of the cable means,
   c. pitch change control means connected to said blade and formed for changing the pitch of the blade independently of the position of the cable means or support means.

* * * * *